Aug. 24, 1926.  
G. JULIAN  
SOLE ROUNDING MACHINE  
Filed Jan. 10, 1921

1,596,932

Witness:  
Alfred H. McGlinchey.

Inventor:  
Gideon Julian

Patented Aug. 24, 1926.

1,596,932

UNITED STATES PATENT OFFICE.

GIDEON JULIAN, OF BEVERLY, MASSACHUSETTS, ASSIGNOR TO UNITED SHOE MACHINERY CORPORATION, OF PATERSON, NEW JERSEY, A CORPORATION OF NEW JERSEY.

SOLE-ROUNDING MACHINE.

Application filed January 10, 1921. Serial No. 436,049.

The invention relates to that class of sole rounding machines which comprise a pattern, a rounding knife, and means for relatively actuating the knife and pattern to cause the knife to travel about the pattern.

This type of rounding machine may be used for rounding or trimming either leather or rubber soles. In rubber sole work the waste chip cut from the edge of the sole blank should be removed at the completion of the rounding operation, since the bevel on which the sole edge is cut tends to retain the chip on the edge of the sole. In leather sole work the chip should also be removed by the operator at the completion of the rounding operation as otherwise the chips may accumulate below the pattern and interfere with the proper operation of the machine.

The object of the present invention is to relieve the operator of the duty of removing the chip, thus increasing the production of the machine and also avoiding the danger of injury to the operator from accidental contact with the knife. To this end the invention contemplates the provision of means acting automatically to remove the chip at the completion of the rounding operation. This means preferably consists of a gripper which, during the travel of the knife, engages that portion of the stock which is to be removed, and thereafter moves outward to remove the chip and carry it beyond the periphery of the knife-carrying table.

Figure 1:
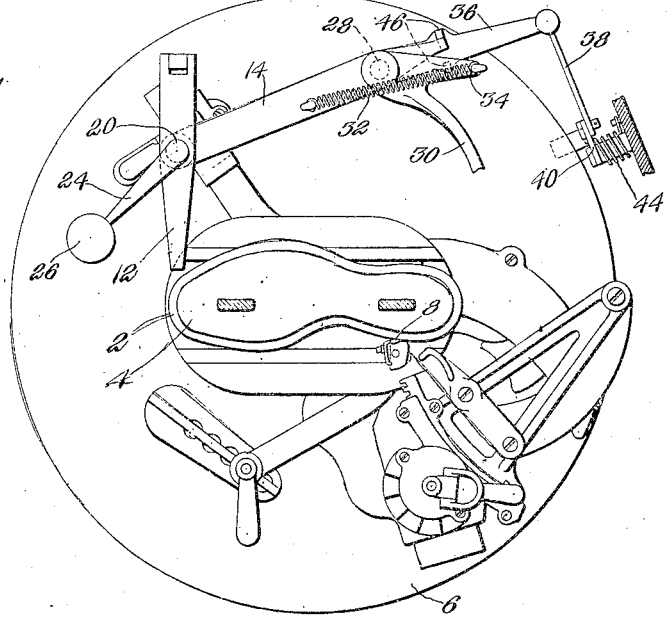
Figure 2:
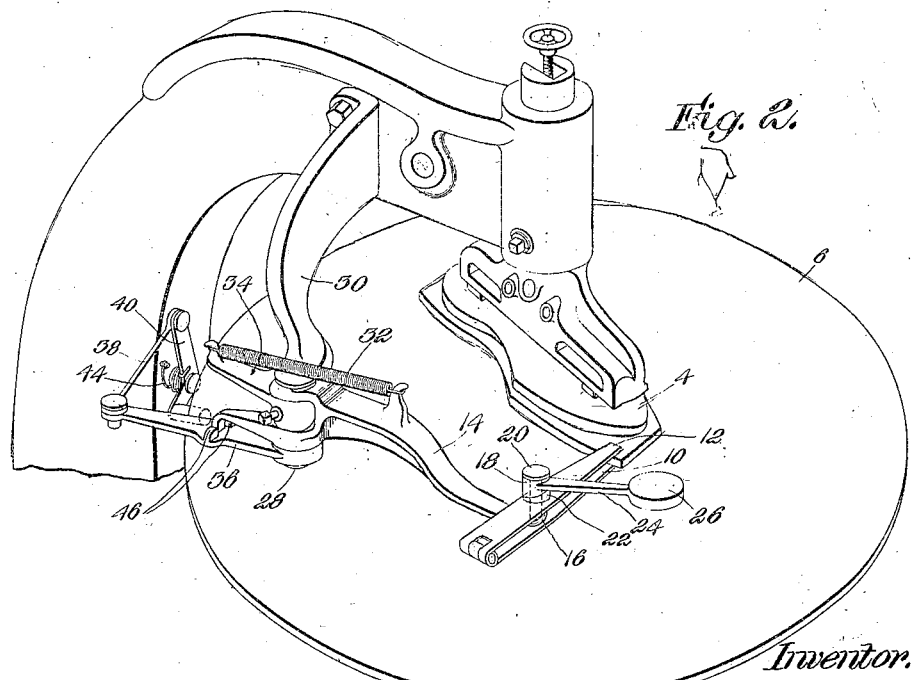

A preferred form of the invention is shown in the accompanying drawings applied to the sole rounding machine of United States Letters Patent No. 1,092,996, April 14, 1914. In the drawings Fig. 1 is a plan view showing so much of the machine as is necessary to illustrate the application of the invention thereto, and Fig. 2 is a perspective view indicating the construction and mode of operation of the chip removing device.

The machine shown comprises the stationary pattern 2, on which the sole blank is clamped by a clamping plate 4, and a rotary table 6, which carries the rounding knife 8. During the rotation of the table the knife travels about the pattern, trimming away the surplus stock which projects along the outline of the pattern. The waste chip thus formed is usually removed by the operator, with a resulting loss of time or danger of injury from the rapidly traveling knife. To avoid this the machine is provided with means for automatically removing the waste chip. In the form shown this means comprises a gripper having a pair of jaws 10 and 12 carried on the end of a swinging lever 14. The lower jaw 10 is secured to the end of the lever while the upper jaw 12 is pivoted to the rear end of the lower jaw and is forced upward to open the jaws by a spring 16. The closing and opening of the jaws is effected and controlled by a cam sleeve 18 mounted to rock on a stud 20, passing through the jaw 12 and secured to the jaw 10. The sleeve is confined between a flange on the upper end of the stud and a cam lug 22 upon the upper side of the jaw 12, and is provided with a radially projecting arm 24 carrying a weight 26. The lever 14 is mounted to swing above a stud 28 mounted in the end of a bracket 30 secured to the over-hanging arm of the machine. A spring 32 connected to the lever and to a projection 34 on the arm 30 is arranged to be carried from one side to the other of the pivot stud 28 by the swinging movement imparted to the lever so that the spring will act to swing the lever in either direction, depending upon the position of the lever. The lever is moved to carry the gripping jaws toward or away from the pattern by a lever 36 mounted to swing on the stud 28 and connected by a link 38 with a bell crank lever 40, the lower arm of which is arranged to be engaged by a cam 42 on the under side of the knife-carrying table 6. A spring 44 acting on the lever 40 tends to move the lever 36 in a direction to swing the gripper carrying lever 14 away from the pattern. The lever 36 is provided with two lugs 46 arranged on opposite sides of the rearwardly projecting arm of the lever 14 and spaced to permit a limited lost motion between the two levers.

The gripper carrying lever 14 will normally stand in its outer position into which it has moved at the completion of the previous rounding operation. After the sole blank has been clamped in position on the pattern, and during the travel of the rounding knife about the pattern, the cam 42 will engage the bell crank lever 40 and swing the lever 36 contra-clockwise. During this movement the inner lug 46 will swing the forward end of lever 14 inward until the spring 32 passes the center of the stud 28, when the spring will act to quickly snap the lever inward until the rear arm of the lever strikes the outer lug 46, thus suddenly stopping the inward movement of the lever. During this movement of the lever 14 the gripper jaws 10 and 12, which are open, are brought into position above and below the projecting edge of the sole blank and as the inward movement of the lever is suddenly arrested the momentum of the weight 26 swings the cam sleeve 18 about the stud 20, thus closing the grippers upon the stock. After the cam 42 passes beyond the bell crank lever 40 the spring 44 tends to swing the lever 14 and the grippers outward, but such movement is prevented by the hold of the grippers on the sole blank. The pull thus exerted on the projecting edge of the stock tends to draw it away from the pattern after the knife has passed the point engaged by the grippers and tends, therefore, to relieve the pressure of the stock upon the knife and thus to facilitate its action. The grippers are preferably arranged to engage the stock near the toe so that the pressure of the stock upon the knife will be somewhat relieved as the knife passes about the toe. As the knife completes its travel about the pattern and thus frees the waste chip the spring 44 swings the lever 36 clockwise and during this movement the outer lug 46 swings the lever 14 outward until the spring 32 passes the center of the pivot stud 28, when this spring acts to snap the lever outward until its movement is suddenly arrested by the engagement of its rear arm with the inner lug 46. As the outward movement of the lever 14 and gripper jaws is thus suddenly arrested the momentum of the weight 26 swings the cam sleeve 18 in a direction to open gripper jaws and thus release the chip and deliver it beyond the outer edge of the table 6. The lever and grippers now remain in their outer position until they are again moved inward during the next rounding operation. The waste chip is thus automatically removed at the completion of each rounding operation without attention on the part of the operator.

While it is preferred to employ substantially the construction and arrangement shown and described in applying the invention to the sole rounding machine of the patent above referred to it will be understood that this construction and arrangement is not essential and may be varied or modified as found desirable or best suited to the construction and mode of operation of the machine to which it is to be applied.

What is claimed is:—

1. A sole rounding machine having, in combination, a pattern and a rounding knife relatively movable to cause the knife to travel about the pattern, and means for seizing the projecting marginal portion of the sole blank and removing it at the completion of the rounding operation.

2. A sole rounding machine having, in combination, a pattern and a rounding knife relatively movable to cause the knife to travel about the pattern, a chip remover, and mechanism for actuating the remover during the rounding to engage the projecting portion of the sole blank and to remove it at the completion of the rounding.

3. A sole rounding machine having, in combination, a pattern and a rounding knife relatively movable to cause the knife to travel about the pattern, a gripper, and means for actuating the gripper to grasp the projecting edge of the sole blank and to carry it away from the pattern when the rounding is completed.

4. A sole rounding machine having, in combination, a pattern and a rounding knife relatively movable to cause the knife to travel about the pattern, a gripper, and means for actuating the gripper to grasp the projecting edge of the sole blank and to exert a pull thereon during the rounding.

5. A sole rounding machine having, in combination, a pattern and a rounding knife relatively movable to cause the knife to travel about the pattern, a gripper mounted for movement toward and from the pattern, means for opening and closing the gripper, and means for moving the gripper toward the pattern during the rounding, and for moving it away from the pattern at the completion of the rounding.

6. A rounding machine having, in combination, a pattern, a rounding knife, mechanism for moving the knife peripherally of the pattern to round a blank contacting with the pattern, and means operated by the knife moving mechanism for removing the waste chip severed from the blank by the rounding operation of the knife.

7. A rounding machine having, in combination, a pattern, a rounding knife relatively movable to cause the knife to travel about the pattern, and a gripper for removing the waste chip at the completion of the rounding operation.

8. A rounding machine having, in combination, a pattern and a rounding knife relatively movable to cause the knife to travel about the pattern, a gripper, and means for causing the operation of the gripper to grip and remove the waste chip severed by the rounding operation.

9. A sole rounding machine having, in combination, a pattern and a rounding knife relatively movable to cause the knife to travel about the pattern, a gripper, and a cam operating to cause the gripper to seize and remove the waste chip severed by the rounding operation.

10. A rounding machine having, in combination, a pattern and a rounding knife relatively movable to cause the knife to travel about the pattern, a gripper, and a cam arranged to cause the gripper to grip the projecting edge of a blank and to exert a pull thereon during the rounding operation.

11. A rounding machine having, in combination, a pattern and a rounding knife relatively movable to cause the knife to travel about the pattern, a gripper mounted for movement toward and from the pattern, a cam for opening and closing the gripper, and means for moving the gripper toward the pattern during the rounding operation, and for moving it away from the pattern at the completion thereof.

12. A sole rounding machine having, in combination, a pattern, a rounding knife relatively movable to cause the knife to travel about the pattern, a gripper mounted for movement toward and from the pattern, a cam for operating the gripper to cause it to seize and release the waste chip severed by the rounding operation, and a cam for moving the gripper toward the pattern during the rounding operation and for moving it away from the pattern at the completion of the rounding operation.

GIDEON JULIAN.